(12) United States Patent
Walawender et al.

(10) Patent No.: US 10,907,386 B2
(45) Date of Patent: Feb. 2, 2021

(54) SIDE DOOR PUSHBUTTON RELEASES

(71) Applicant: Ford Global Technologies, LLC, Dearborn, MI (US)

(72) Inventors: Chester Stanislaus Walawender, Livonia, MI (US); Rajesh K. Patel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 16/002,650

(22) Filed: Jun. 7, 2018

(65) Prior Publication Data

US 2019/0376324 A1    Dec. 12, 2019

(51) Int. Cl.
| | | |
|---|---|---|
| *E05B 81/76* | (2014.01) | |
| *E05F 15/60* | (2015.01) | |
| *E05F 15/76* | (2015.01) | |
| *B60R 25/01* | (2013.01) | |
| *B60R 25/20* | (2013.01) | |

(Continued)

(52) U.S. Cl.
CPC .............. *E05B 81/77* (2013.01); *B60R 25/01* (2013.01); *B60R 25/2036* (2013.01); *B60R 25/30* (2013.01); *E05B 17/10* (2013.01); *E05F 15/60* (2015.01); *E05F 15/76* (2015.01)

(58) Field of Classification Search
CPC .......... E05B 81/77; E05B 17/10; E05F 15/60; E05F 15/76; B60R 25/01; B60R 25/2036; B60R 25/30
USPC .......................... 49/501, 502, 503; 296/146.4
See application file for complete search history.

(56) References Cited

U.S. PATENT DOCUMENTS

| | | |
|---|---|---|
| 2,229,909 A | 1/1941 | Wread |
| 2,553,023 A | 5/1951 | Walters |
| 3,479,767 A | 11/1969 | Gardner et al. |

(Continued)

FOREIGN PATENT DOCUMENTS

| | | |
|---|---|---|
| CN | 1232936 C | 12/2005 |
| CN | 201198681 Y | 2/2009 |

(Continued)

OTHER PUBLICATIONS

"Push Button to open your car door" Online video clip. YouTube, Mar. 10, 2010. 1 page.

(Continued)

*Primary Examiner* — Justin V Lewis
(74) *Attorney, Agent, or Firm* — David L. Coppiellie; Price Heneveld LLP

(57) ABSTRACT

A vehicle door system includes a controller and a powered latch that is configured to selectively retain a door structure in a closed position when the powered latch is latched. The powered latch permits the door to be opened when the powered latch is unlatched. An electronic door release pad is disposed on an outer side of the door structure. The door release pad includes a pad surface that faces outwardly away from the door structure. A generally flat outer side of the door structure extends around the perimeter of the pad surface. The pad surface preferably comprises a sensor. The controller is configured to generate a signal to unlatch the powered latch if the door release pad generates a signal indicating that a user has touched the pad surface and/or that an object has been detected adjacent the pad.

19 Claims, 5 Drawing Sheets

(51) Int. Cl.
*B60R 25/30* (2013.01)
*E05B 17/10* (2006.01)

(56) References Cited

U.S. PATENT DOCUMENTS

| | | | |
|---|---|---|---|
| 3,605,459 A | 9/1971 | Van Dalen |
| 3,751,718 A | 8/1973 | Hanchett |
| 3,771,823 A | 11/1973 | Schnarr |
| 3,854,310 A | 12/1974 | Paull |
| 3,858,922 A | 1/1975 | Yamanaka |
| 4,193,619 A | 3/1980 | Jeril |
| 4,206,491 A | 6/1980 | Ligman et al. |
| 4,425,597 A | 1/1984 | Schramm |
| 4,457,148 A | 7/1984 | Johansson et al. |
| 4,640,050 A | 2/1987 | Yamagishi et al. |
| 4,672,348 A | 6/1987 | Duve |
| 4,674,230 A | 6/1987 | Takeo et al. |
| 4,674,781 A | 6/1987 | Reece et al. |
| 4,702,117 A | 10/1987 | Tsutsumi et al. |
| 4,848,031 A | 6/1989 | Yamagishi et al. |
| 4,858,971 A | 8/1989 | Haag |
| 4,889,373 A | 12/1989 | Ward et al. |
| 4,929,007 A | 5/1990 | Bartczak et al. |
| 5,018,057 A | 5/1991 | Biggs et al. |
| 5,056,343 A | 10/1991 | Kleefeldt et al. |
| 5,058,258 A | 10/1991 | Harvey |
| 5,074,073 A | 12/1991 | Zwebner |
| 5,092,637 A | 3/1992 | Miller |
| 5,173,991 A | 12/1992 | Carswell |
| 5,239,779 A | 8/1993 | Deland et al. |
| 5,263,762 A | 11/1993 | Long et al. |
| 5,297,010 A | 3/1994 | Camarota et al. |
| 5,332,273 A | 7/1994 | Komachi |
| 5,334,969 A | 8/1994 | Abe et al. |
| 5,494,322 A | 2/1996 | Menke |
| 5,497,641 A | 3/1996 | Linde et al. |
| 5,535,608 A | 7/1996 | Brin |
| 5,547,208 A | 8/1996 | Chappell et al. |
| 5,551,187 A | 9/1996 | Brouwer et al. |
| 5,581,230 A | 12/1996 | Barrett |
| 5,583,405 A | 12/1996 | Sai et al. |
| 5,613,716 A | 3/1997 | Cafferty |
| 5,618,068 A | 4/1997 | Mitsui et al. |
| 5,632,120 A | 5/1997 | Shigematsu et al. |
| 5,632,515 A | 5/1997 | Dowling |
| 5,644,869 A | 7/1997 | Buchanan, Jr. |
| 5,653,484 A | 8/1997 | Brackmann et al. |
| 5,662,369 A | 9/1997 | Tsuge |
| 5,684,470 A | 11/1997 | Deland et al. |
| 5,744,874 A | 4/1998 | Yoshida et al. |
| 5,755,059 A | 5/1998 | Schap |
| 5,783,994 A | 7/1998 | Koopman, Jr. et al. |
| 5,802,894 A | 9/1998 | Jahrsetz et al. |
| 5,808,555 A | 9/1998 | Bartel |
| 5,852,944 A | 12/1998 | Collard, Jr. et al. |
| 5,859,479 A | 1/1999 | David |
| 5,895,089 A | 4/1999 | Singh et al. |
| 5,896,026 A | 4/1999 | Higgins |
| 5,896,768 A | 4/1999 | Cranick et al. |
| 5,898,536 A | 4/1999 | Won |
| 5,901,991 A | 5/1999 | Hugel et al. |
| 5,921,612 A | 7/1999 | Mizuki et al. |
| 5,927,794 A | 7/1999 | Mobius |
| 5,964,487 A | 10/1999 | Shamblin |
| 5,979,754 A | 11/1999 | Martin et al. |
| 5,992,194 A | 11/1999 | Baukholt et al. |
| 6,000,257 A | 12/1999 | Thomas |
| 6,027,148 A | 2/2000 | Shoemaker |
| 6,038,895 A | 3/2000 | Menke et al. |
| 6,042,159 A | 3/2000 | Spitzley et al. |
| 6,043,735 A | 3/2000 | Barrett |
| 6,050,117 A | 4/2000 | Weyerstall |
| 6,056,076 A | 5/2000 | Bartel et al. |
| 6,065,316 A | 5/2000 | Sato et al. |
| 6,072,403 A | 6/2000 | Iwasaki et al. |
| 6,075,294 A | 6/2000 | Van den Boom et al. |
| 6,089,626 A | 7/2000 | Shoemaker |
| 6,091,162 A | 7/2000 | Williams, Jr. et al. |
| 6,099,048 A | 8/2000 | Salmon et al. |
| 6,125,583 A | 10/2000 | Murray et al. |
| 6,130,614 A | 10/2000 | Miller |
| 6,145,918 A | 11/2000 | Wilbanks, II |
| 6,157,090 A | 12/2000 | Vogel |
| 6,181,024 B1 | 1/2001 | Geil |
| 6,198,995 B1 | 3/2001 | Settles et al. |
| 6,241,294 B1 | 6/2001 | Young et al. |
| 6,247,343 B1 | 6/2001 | Weiss et al. |
| 6,256,932 B1 | 7/2001 | Jyawook et al. |
| 6,271,745 B1 | 8/2001 | Anazi et al. |
| 6,305,737 B1 | 10/2001 | Corder et al. |
| 6,341,448 B1 | 1/2002 | Murray |
| 6,357,803 B1 | 3/2002 | Lorek |
| 6,361,091 B1 | 3/2002 | Weschler |
| 6,405,485 B1 | 6/2002 | Itami et al. |
| 6,406,073 B1 | 6/2002 | Watanabe |
| 6,441,512 B1 | 8/2002 | Jakel et al. |
| 6,460,905 B2 | 10/2002 | Suss |
| 6,470,719 B1 | 10/2002 | Franz et al. |
| 6,480,098 B2 | 11/2002 | Flick |
| 6,481,056 B1 | 11/2002 | Jesse |
| 6,515,377 B1 | 2/2003 | Uberlein et al. |
| 6,523,376 B2 | 2/2003 | Baukholt et al. |
| 6,550,826 B2 | 4/2003 | Fukushima et al. |
| 6,554,328 B2 | 4/2003 | Cetnar et al. |
| 6,556,900 B1 | 4/2003 | Brynielsson |
| 6,602,077 B2 | 8/2003 | Kasper et al. |
| 6,606,492 B1 | 8/2003 | Losey |
| 6,629,711 B1 | 10/2003 | Gleason et al. |
| 6,639,161 B2 | 10/2003 | Meagher et al. |
| 6,657,537 B1 | 12/2003 | Hauler |
| 6,659,515 B2 | 12/2003 | Raymond et al. |
| 6,701,671 B1 | 3/2004 | Fukumoto et al. |
| 6,712,409 B2 | 3/2004 | Monig |
| 6,715,806 B2 | 4/2004 | Arlt et al. |
| 6,734,578 B2 | 5/2004 | Konno et al. |
| 6,740,834 B2 | 5/2004 | Sueyoshi et al. |
| 6,768,413 B1 | 7/2004 | Kemmann et al. |
| 6,779,372 B2 | 8/2004 | Arlt et al. |
| 6,783,167 B2 | 8/2004 | Bingle et al. |
| 6,786,070 B1 | 9/2004 | Dimig et al. |
| 6,794,837 B1 | 9/2004 | Whinnery et al. |
| 6,825,752 B2 | 11/2004 | Nahata et al. |
| 6,829,357 B1 | 12/2004 | Alrabady et al. |
| 6,843,085 B2 | 1/2005 | Dimig |
| 6,854,870 B2 | 2/2005 | Huizenga |
| 6,879,058 B2 | 4/2005 | Lorenz et al. |
| 6,883,836 B2 | 4/2005 | Breay et al. |
| 6,883,839 B2 | 4/2005 | Belmond et al. |
| 6,910,302 B2 | 6/2005 | Crawford |
| 6,914,346 B2 | 7/2005 | Girard |
| 6,923,479 B2 | 8/2005 | Aiyama et al. |
| 6,933,655 B2 | 8/2005 | Morrison et al. |
| 6,946,978 B2 | 9/2005 | Schofield |
| 7,005,959 B2 | 2/2006 | Amagasa |
| 7,038,414 B2 | 5/2006 | Daniels et al. |
| 7,055,997 B2 | 6/2006 | Baek |
| 7,062,945 B2 | 6/2006 | Saitoh et al. |
| 7,070,018 B2 | 7/2006 | Kachouh |
| 7,070,213 B2 | 7/2006 | Willats et al. |
| 7,090,285 B2 | 8/2006 | Markevich et al. |
| 7,091,823 B2 | 8/2006 | Ieda et al. |
| 7,091,836 B2 | 8/2006 | Kachouh et al. |
| 7,097,226 B2 | 8/2006 | Bingle et al. |
| 7,106,171 B1 | 9/2006 | Burgess |
| 7,108,301 B2 | 9/2006 | Louvel |
| 7,126,453 B2 | 10/2006 | Sandau et al. |
| 7,145,436 B2 | 12/2006 | Ichikawa et al. |
| 7,161,152 B2 | 1/2007 | Dipoala |
| 7,170,253 B2 | 1/2007 | Spurr et al. |
| 7,173,346 B2 | 2/2007 | Aiyama et al. |
| 7,176,810 B2 | 2/2007 | Inoue |
| 7,180,400 B2 | 2/2007 | Amagasa |
| 7,192,076 B2 | 3/2007 | Ottino |
| 7,204,530 B2 | 4/2007 | Lee |

(56) References Cited

U.S. PATENT DOCUMENTS

| | | |
|---|---|---|
| 7,205,777 B2 | 4/2007 | Schultz et al. |
| 7,221,255 B2 | 5/2007 | Johnson et al. |
| 7,224,259 B2 | 5/2007 | Bemond et al. |
| 7,248,955 B2 | 7/2007 | Hein et al. |
| 7,263,416 B2 | 8/2007 | Sakurai et al. |
| 7,270,029 B1 | 9/2007 | Papanikolaou et al. |
| 7,325,843 B2 | 2/2008 | Coleman et al. |
| 7,342,373 B2 | 3/2008 | Newman et al. |
| 7,360,803 B2 | 4/2008 | Parent et al. |
| 7,363,788 B2 | 4/2008 | Dimig et al. |
| 7,375,299 B1 | 5/2008 | Pudney |
| 7,399,010 B2 | 7/2008 | Hunt et al. |
| 7,446,645 B2 | 11/2008 | Steegmann |
| 7,576,631 B1 | 8/2009 | Bingle et al. |
| 7,642,669 B2 | 1/2010 | Spurr |
| 7,686,378 B2 | 3/2010 | Gisler et al. |
| 7,688,179 B2 | 3/2010 | Kurpinski et al. |
| 7,705,722 B2 | 4/2010 | Shoemaker et al. |
| 7,747,286 B2 | 6/2010 | Conforti |
| 7,780,207 B2 | 8/2010 | Gotou et al. |
| 7,791,218 B2 | 9/2010 | Mekky et al. |
| 7,926,385 B2 | 4/2011 | Papanikolaou et al. |
| 7,931,314 B2 | 4/2011 | Nitawaki et al. |
| 7,937,893 B2 | 5/2011 | Pribisic |
| 8,028,375 B2 | 10/2011 | Nakaura et al. |
| 8,093,987 B2 | 1/2012 | Kurpinski et al. |
| 8,126,450 B2 | 2/2012 | Howarter et al. |
| 8,141,296 B2 | 3/2012 | Bem |
| 8,141,916 B2 | 3/2012 | Tomaszewski et al. |
| 8,169,317 B2 | 5/2012 | Lemerand et al. |
| 8,193,462 B2 | 6/2012 | Zanini et al. |
| 8,224,313 B2 | 7/2012 | Howarter et al. |
| 8,272,165 B2 | 9/2012 | Tomioka |
| 8,376,416 B2 | 2/2013 | Arabia, Jr. et al. |
| 8,398,128 B2 | 3/2013 | Arabia et al. |
| 8,405,515 B2 | 3/2013 | Ishihara et al. |
| 8,405,527 B2 | 3/2013 | Chung et al. |
| 8,419,114 B2 | 4/2013 | Fannon |
| 8,451,087 B2 | 5/2013 | Krishnan et al. |
| 8,454,062 B2 | 6/2013 | Rohlfing et al. |
| 8,474,889 B2 | 7/2013 | Reifenberg et al. |
| 8,532,873 B1 | 9/2013 | Bambenek |
| 8,534,101 B2 | 9/2013 | Mette et al. |
| 8,544,901 B2 | 10/2013 | Krishnan et al. |
| 8,573,657 B2 | 11/2013 | Papanikolaou et al. |
| 8,584,402 B2 | 11/2013 | Yamaguchi |
| 8,601,903 B1 | 12/2013 | Klein et al. |
| 8,616,595 B2 | 12/2013 | Wellborn et al. |
| 8,648,689 B2 | 2/2014 | Hathaway et al. |
| 8,690,204 B2 | 4/2014 | Lang et al. |
| 8,746,755 B2 | 6/2014 | Papanikolaou et al. |
| 8,826,596 B2 | 9/2014 | Tensing |
| 8,833,811 B2 | 9/2014 | Ishikawa |
| 8,903,605 B2 | 12/2014 | Bambenek |
| 8,915,524 B2 | 12/2014 | Charnesky |
| 8,963,701 B2 | 2/2015 | Rodriguez |
| 8,965,287 B2 | 2/2015 | Lam |
| 9,003,707 B2 | 4/2015 | Reddmann |
| 9,076,274 B2 | 7/2015 | Kamiya |
| 9,159,219 B2 | 10/2015 | Magner et al. |
| 9,184,777 B2 | 11/2015 | Esselink et al. |
| 9,187,012 B2 | 11/2015 | Sachs et al. |
| 9,189,900 B1 | 11/2015 | Penilla et al. |
| 9,260,882 B2 | 2/2016 | Krishnan et al. |
| 9,284,757 B2 | 3/2016 | Kempel |
| 9,322,204 B2 | 4/2016 | Suzuki |
| 9,353,566 B2 | 5/2016 | Miu et al. |
| 9,382,741 B2 | 7/2016 | Konchan et al. |
| 9,405,120 B2 | 8/2016 | Graf |
| 9,409,579 B2 | 8/2016 | Eichin et al. |
| 9,416,565 B2 | 8/2016 | Papanikolaou et al. |
| 9,475,369 B2 | 10/2016 | Sugiura et al. |
| 9,481,325 B1 | 11/2016 | Lange |
| 9,493,975 B1 | 11/2016 | Li |
| 9,518,408 B1 | 12/2016 | Krishnan |
| 9,522,590 B2 | 12/2016 | Fujimoto et al. |
| 9,546,502 B2 | 1/2017 | Lange |
| 9,551,166 B2 | 1/2017 | Patel et al. |
| 9,725,069 B2 | 8/2017 | Krishnan |
| 9,777,528 B2 | 10/2017 | Elie et al. |
| 9,797,178 B2 | 10/2017 | Elie et al. |
| 9,797,181 B2 | 10/2017 | Wheeler et al. |
| 9,834,964 B2 | 12/2017 | Van Wiemeersch et al. |
| 9,845,071 B1 | 12/2017 | Krishnan |
| 9,903,142 B2 | 2/2018 | Van Wiemeersch et al. |
| 9,909,344 B2 | 3/2018 | Krishnan et al. |
| 9,957,737 B2 | 5/2018 | Patel et al. |
| 2001/0005078 A1 | 6/2001 | Fukushima et al. |
| 2001/0030871 A1 | 10/2001 | Anderson |
| 2002/0000726 A1 | 1/2002 | Zintler |
| 2002/0111844 A1 | 8/2002 | Vanstory et al. |
| 2002/0121967 A1 | 9/2002 | Bowen et al. |
| 2002/0186144 A1 | 12/2002 | Meunier |
| 2003/0009855 A1 | 1/2003 | Budzynski |
| 2003/0025337 A1 | 2/2003 | Suzuki et al. |
| 2003/0038544 A1 | 2/2003 | Spurr |
| 2003/0101781 A1 | 6/2003 | Budzynski et al. |
| 2003/0107473 A1 | 6/2003 | Pang et al. |
| 2003/0111863 A1 | 6/2003 | Weyerstall et al. |
| 2003/0139155 A1 | 7/2003 | Sakai |
| 2003/0172695 A1 | 9/2003 | Buschmann |
| 2003/0182863 A1 | 10/2003 | Mejean et al. |
| 2003/0184098 A1 | 10/2003 | Aiyama |
| 2003/0216817 A1 | 11/2003 | Pudney |
| 2004/0061462 A1 | 4/2004 | Bent et al. |
| 2004/0093155 A1 | 5/2004 | Simonds et al. |
| 2004/0124708 A1 | 7/2004 | Giehler et al. |
| 2004/0195845 A1 | 10/2004 | Chevalier |
| 2004/0217601 A1 | 11/2004 | Garnault et al. |
| 2005/0057047 A1 | 3/2005 | Kachouh |
| 2005/0068712 A1 | 3/2005 | Schulz et al. |
| 2005/0216133 A1 | 9/2005 | MacDougall et al. |
| 2005/0218913 A1 | 10/2005 | Inaba |
| 2006/0056663 A1 | 3/2006 | Call |
| 2006/0100002 A1 | 5/2006 | Luebke et al. |
| 2006/0186987 A1 | 8/2006 | Wilkins |
| 2007/0001467 A1 | 1/2007 | Muller et al. |
| 2007/0090654 A1 | 4/2007 | Eaton |
| 2007/0115191 A1 | 5/2007 | Hashiguchi et al. |
| 2007/0120645 A1 | 5/2007 | Nakashima |
| 2007/0126243 A1 | 6/2007 | Papanikolaou et al. |
| 2007/0132553 A1 | 6/2007 | Nakashima |
| 2007/0170727 A1 | 7/2007 | Kohlstrand et al. |
| 2008/0021619 A1 | 1/2008 | Steegmann et al. |
| 2008/0060393 A1 | 3/2008 | Johansson et al. |
| 2008/0068129 A1 | 3/2008 | Ieda et al. |
| 2008/0129446 A1 | 6/2008 | Vader |
| 2008/0143139 A1 | 6/2008 | Bauer et al. |
| 2008/0202912 A1 | 8/2008 | Boddie et al. |
| 2008/0203737 A1 | 8/2008 | Tomaszewski et al. |
| 2008/0211623 A1 | 9/2008 | Scheurich |
| 2008/0217956 A1 | 9/2008 | Gschweng et al. |
| 2008/0224482 A1 | 9/2008 | Cumbo et al. |
| 2008/0230006 A1 | 9/2008 | Kirchoff et al. |
| 2008/0250718 A1 | 10/2008 | Papanikolaou et al. |
| 2008/0296927 A1 | 12/2008 | Gisler et al. |
| 2008/0303291 A1 | 12/2008 | Spurr |
| 2008/0307711 A1 | 12/2008 | Kern et al. |
| 2009/0033104 A1 | 2/2009 | Konchan et al. |
| 2009/0033477 A1 | 2/2009 | Illium et al. |
| 2009/0145181 A1 | 6/2009 | Pecoul et al. |
| 2009/0160211 A1 | 6/2009 | Krishnan et al. |
| 2009/0177336 A1 | 7/2009 | McClellan et al. |
| 2009/0240400 A1 | 9/2009 | Lachapelle et al. |
| 2009/0257241 A1 | 10/2009 | Meinke et al. |
| 2010/0007463 A1 | 1/2010 | Dingman et al. |
| 2010/0005233 A1 | 3/2010 | Arabia et al. |
| 2010/0052337 A1 | 3/2010 | Arabia, Jr. et al. |
| 2010/0060505 A1 | 3/2010 | Witkowski |
| 2010/0097186 A1 | 4/2010 | Wielebski |
| 2010/0175945 A1 | 7/2010 | Helms |
| 2010/0235057 A1 | 9/2010 | Papanikolaou et al. |
| 2010/0235058 A1 | 9/2010 | Papanikolaou et al. |
| 2010/0235059 A1 | 9/2010 | Krishnan et al. |

(56) References Cited

U.S. PATENT DOCUMENTS

| | | |
|---|---|---|
| 2010/0237635 A1 | 9/2010 | Ieda et al. |
| 2010/0253535 A1 | 10/2010 | Thomas |
| 2010/0265034 A1 | 10/2010 | Cap et al. |
| 2010/0315267 A1 | 12/2010 | Chung et al. |
| 2011/0041409 A1 | 2/2011 | Newman et al. |
| 2011/0060480 A1 | 3/2011 | Mottla et al. |
| 2011/0148575 A1 | 6/2011 | Sobecki et al. |
| 2011/0154740 A1 | 6/2011 | Matsumoto et al. |
| 2011/0180350 A1 | 7/2011 | Thacker |
| 2011/0203181 A1 | 8/2011 | Magner et al. |
| 2011/0203336 A1 | 8/2011 | Mette et al. |
| 2011/0227351 A1 | 9/2011 | Grosedemouge |
| 2011/0248862 A1 | 10/2011 | Budampati |
| 2011/0252845 A1 | 10/2011 | Webb et al. |
| 2011/0254292 A1 | 10/2011 | Ishii |
| 2011/0313937 A1 | 12/2011 | Moore, Jr. et al. |
| 2012/0119524 A1 | 5/2012 | Bingle et al. |
| 2012/0154292 A1 | 6/2012 | Zhao et al. |
| 2012/0180394 A1 | 7/2012 | Shinohara |
| 2012/0205925 A1 | 8/2012 | Muller et al. |
| 2012/0228886 A1 | 9/2012 | Muller et al. |
| 2012/0252402 A1 | 10/2012 | Jung |
| 2013/0049403 A1 | 2/2013 | Fannon et al. |
| 2013/0069761 A1 | 3/2013 | Tieman |
| 2013/0079984 A1 | 3/2013 | Aerts et al. |
| 2013/0104459 A1 | 5/2013 | Patel et al. |
| 2013/0127180 A1 | 5/2013 | Heberer et al. |
| 2013/0138303 A1 | 5/2013 | McKee et al. |
| 2013/0207794 A1 | 8/2013 | Patel |
| 2013/0282226 A1 | 10/2013 | Pollmann |
| 2013/0295913 A1 | 11/2013 | Matthews, III et al. |
| 2013/0311046 A1 | 11/2013 | Heberer et al. |
| 2013/0321065 A1 | 12/2013 | Salter et al. |
| 2013/0325521 A1 | 12/2013 | Jameel |
| 2014/0000165 A1* | 1/2014 | Patel ............... E05B 81/76 49/31 |
| 2014/0007404 A1 | 1/2014 | Krishnan et al. |
| 2014/0015637 A1 | 1/2014 | Dassanakake et al. |
| 2014/0088825 A1 | 3/2014 | Lange et al. |
| 2014/0129113 A1 | 5/2014 | Van Wiemeersch et al. |
| 2014/0150581 A1 | 6/2014 | Scheuring et al. |
| 2014/0156111 A1 | 6/2014 | Ehrman |
| 2014/0188999 A1 | 7/2014 | Leonard et al. |
| 2014/0200774 A1 | 7/2014 | Lange et al. |
| 2014/0227980 A1 | 8/2014 | Esselink et al. |
| 2014/0242971 A1 | 8/2014 | Aladenize et al. |
| 2014/0245666 A1 | 9/2014 | Ishida et al. |
| 2014/0256304 A1 | 9/2014 | Frye et al. |
| 2014/0278599 A1 | 9/2014 | Reh |
| 2014/0293753 A1 | 10/2014 | Pearson |
| 2014/0338409 A1 | 11/2014 | Kraus et al. |
| 2014/0347163 A1 | 11/2014 | Banter et al. |
| 2015/0001926 A1 | 1/2015 | Kageyama et al. |
| 2015/0048927 A1 | 2/2015 | Simmons |
| 2015/0059250 A1 | 3/2015 | Miu et al. |
| 2015/0084739 A1 | 3/2015 | Lemoult et al. |
| 2015/0149042 A1 | 5/2015 | Cooper et al. |
| 2015/0161832 A1 | 6/2015 | Esselink et al. |
| 2015/0197205 A1 | 7/2015 | Xiong |
| 2015/0240548 A1 | 8/2015 | Bendel et al. |
| 2015/0294518 A1 | 10/2015 | Peplin |
| 2015/0330112 A1 | 11/2015 | Van Wiemeersch et al. |
| 2015/0330113 A1 | 11/2015 | Van Wiemeersch et al. |
| 2015/0330114 A1 | 11/2015 | Linden et al. |
| 2015/0330117 A1 | 11/2015 | Van Wiemeersch et al. |
| 2015/0330133 A1 | 11/2015 | Konchan et al. |
| 2015/0360545 A1 | 12/2015 | Nanla |
| 2015/0371031 A1 | 12/2015 | Ueno et al. |
| 2016/0060909 A1 | 3/2016 | Krishnan et al. |
| 2016/0130843 A1 | 5/2016 | Bingle |
| 2016/0138306 A1 | 5/2016 | Krishnan et al. |
| 2016/0153216 A1 | 6/2016 | Funahashi et al. |
| 2016/0273255 A1 | 9/2016 | Suzuki et al. |
| 2016/0326779 A1 | 11/2016 | Papanikolaou et al. |
| 2017/0014039 A1 | 1/2017 | Pahlevan et al. |
| 2017/0022742 A1 | 1/2017 | Seki et al. |
| 2017/0058588 A1 | 3/2017 | Wheeler et al. |
| 2017/0074006 A1 | 3/2017 | Patel et al. |
| 2017/0101076 A1* | 4/2017 | Krishnan ............... E05B 81/78 |
| 2017/0247016 A1 | 8/2017 | Krishnan |
| 2017/0270490 A1 | 9/2017 | Penilla et al. |
| 2017/0306662 A1 | 10/2017 | Och et al. |
| 2017/0349146 A1 | 12/2017 | Krishnan |
| 2018/0038147 A1 | 2/2018 | Linden et al. |
| 2018/0051493 A1 | 2/2018 | Krishnan et al. |
| 2018/0051498 A1 | 2/2018 | Van Wiemeersch et al. |
| 2018/0058128 A1 | 3/2018 | Khan et al. |
| 2018/0065598 A1 | 3/2018 | Krishnan |
| 2018/0080270 A1 | 3/2018 | Khan et al. |
| 2018/0128022 A1 | 5/2018 | Van Wiemeersh et al. |

FOREIGN PATENT DOCUMENTS

| | | |
|---|---|---|
| CN | 201280857 | 7/2009 |
| CN | 101527061 A | 9/2009 |
| CN | 201567872 U | 9/2010 |
| CN | 101932466 A | 12/2010 |
| CN | 201915717 U | 8/2011 |
| CN | 202200933 U | 4/2012 |
| CN | 202686247 U | 1/2013 |
| CN | 103206117 A | 7/2013 |
| CN | 103264667 A | 8/2013 |
| CN | 203511548 U | 4/2014 |
| CN | 204326814 U | 5/2015 |
| DE | 4403655 A1 | 8/1995 |
| DE | 19620059 A1 | 11/1997 |
| DE | 19642698 A1 | 4/1998 |
| DE | 19642698 A2 | 11/2000 |
| DE | 10212794 A1 | 6/2003 |
| DE | 20121915 U1 | 11/2003 |
| DE | 10309821 A1 | 9/2004 |
| DE | 102005041551 A1 | 3/2007 |
| DE | 102006029774 A1 | 1/2008 |
| DE | 102006040211 A1 | 3/2008 |
| DE | 102006041928 A1 | 3/2008 |
| DE | 102010052582 A1 | 5/2012 |
| DE | 102011051165 A1 | 12/2012 |
| DE | 102015101164 | 7/2015 |
| DE | 102014107809 A1 | 12/2015 |
| EP | 0372791 A2 | 6/1990 |
| EP | 0694664 A1 | 1/1996 |
| EP | 1162332 A1 | 12/2001 |
| EP | 1284334 A1 | 2/2003 |
| EP | 1288403 A2 | 3/2003 |
| EP | 1284334 A1 | 9/2003 |
| EP | 1460204 A2 | 9/2004 |
| EP | 1465119 A1 | 10/2004 |
| EP | 1338731 A2 | 2/2005 |
| EP | 1944436 A2 | 7/2008 |
| EP | 2053744 A2 | 4/2009 |
| EP | 2314803 A2 | 4/2011 |
| FR | 2698838 A1 | 6/1994 |
| FR | 2783547 A1 | 3/2000 |
| FR | 2841285 A1 | 12/2003 |
| FR | 2860261 A1 | 4/2005 |
| FR | 2948402 A1 | 7/2009 |
| FR | 2955604 A1 | 7/2011 |
| GB | 2402840 A | 12/2004 |
| GB | 2496754 A | 5/2013 |
| JP | 62255256 A | 11/1987 |
| JP | 05059855 A | 3/1993 |
| JP | 406167156 A | 6/1994 |
| JP | 406185250 A | 7/1994 |
| JP | 2000064685 A | 2/2000 |
| JP | 2000314258 A | 11/2000 |
| JP | 2007100342 A | 4/2007 |
| JP | 2007138500 A | 6/2007 |
| KR | 20030025738 A | 3/2003 |
| KR | 20120108580 A | 10/2012 |
| WO | 0123695 A1 | 4/2001 |
| WO | 03095776 A1 | 11/2003 |
| WO | 2013111615 A1 | 8/2013 |
| WO | 2013146918 A1 | 10/2013 |
| WO | 2014146186 A1 | 9/2014 |

(56) References Cited

FOREIGN PATENT DOCUMENTS

| WO | 2015064001 A1 | 5/2015 |
|---|---|---|
| WO | 2015145868 A1 | 10/2015 |
| WO | 2017160787 A2 | 9/2017 |

OTHER PUBLICATIONS

Car of the Week: 1947 Lincoln convertible by: bearnest May 29, 2012 http://www.oldcarsweekly.com/car-of-the-week/car-of-the-week-1947-lincoln-convertible. 7 pages.
Kisteler Instruments, "Force Sensors Ensure Car Door Latch is Within Specification," Article, Jan. 1, 2005, 3 pages.
General Motors Corporation, 2006 Chevrolet Corvette Owner Manual, © 2005 General Motors Corporation, 4 pages.
General Motors LLC, 2013 Chevrolet Corvette Owner Manual, 2012, 17 pages.
General Motors, "Getting to Know Your 2014 Corvette," Quick Reference Guide, 2013, 16 pages.
InterRegs Ltd., Federal Motor Vehicle Safety Standard, "Door Locks and Door Retention Components," 2012, F.R. vol. 36 No. 232—Feb. 12, 1971, 23 pages.
Ross Downing, "How to Enter & Exit a Corvette With a Dead Battery," YouTube video http://www.youtube.com/watch?v=DLDqmGQU6L0, Jun. 6, 2011, 1 page.
Jeff Glucker, "Friends videotape man 'trapped' inside C6 Corette with dead battery," YouTube via Corvett Online video http://www.autoblog.com/2011/05/14/friends-videotape-man-trapped-inside-c6-corvette-with-dead-bat/, May 14, 2011, 1 page.
Don Roy, "ZR1 Owner Calls 911 After Locking Self in Car," website http://www.corvetteonline.com/news/zr1-owner-calls-911-after-locking-self-in-car/, Apr. 13, 2011, 2 pages.
Zach Bowman, "Corvette with dead battery traps would-be thief," website http://www.autoblog.com/2011/10/25/corvette-with-dead-battery-traps-would-be-thief/, Oct. 25, 2011, 2 pages.
U.S. Appl. No. 14/468,634, filed Aug. 26, 2014, 15 pages.
U.S. Appl. No. 13/608,303, filed Sep. 10, 2012, 15 pages.
Bryan Laviolette, "GM's New App Turns Smartphones into Virtual Keys," Article, Jul. 22, 2010, 2 pages.
Hyundai Bluelink, "Send Directions to your car," Link to App, 2015, 3 pages.
U.S. Appl. No. 14/276,415, filed May 13, 2014, 18 pages.
Office Action dated Mar. 10, 2017, U.S. Appl. No. 15/174,206, filed Jun. 6, 2016, 17 pages.
Zipcar.com, "Car Sharing from Zipcar: How Does car Sharing Work?" Feb. 9, 2016, 6 pages.
Department of Transportation, "Federal Motor Vehicle Safety Standards; Door Locks and Door Retention Components and Side Impact Protection," http://www.nhtsa.gov/cars/rules/rulings/DoorLocks/DoorLocks_NPRM.html#VI_C, 23 pages, Aug. 28, 2010.
U.S. Appl. No. 14/276,415, Office Action dated Mar. 28, 2018, 19 pages.
U.S. Appl. No. 12/402,744, Office Action dated Oct. 23, 2013, 7 pages.
U.S. Appl. No. 12/402,744, Advisory Action dated Jan. 31, 2014, 2 pages.
U.S. Appl. No. 14/280,035, filed May 16, 2014, entitled "Powered Latch System for Vehicle Doors and Control System Therefor."
U.S. Appl. No. 14/281,998, filed May 20, 2014, entitled "Vehicle Door Handle and Powered Latch System."
U.S. Appl. No. 14/282,224, filed May 20, 2014, entitled "Powered Vehicle Door Latch and Exterior Handle With Sensor."
George Kennedy, "Keyfree app replaces conventional keys with your smart phone," website, Jan. 5, 2015, 2 pages.
Hyundai Motor India Limited, "Hyundai Care," website, Dec. 8, 2015, 3 pages.
Keyfree Technologies Inc., "Keyfree," website, Jan. 10, 2014, 2 pages.
Prweb, "Keyfree Technologies Inc. Launches the First Digital Car Key," Jan. 9, 2014, 3 pages.

\* cited by examiner

SIDE DOOR PUSHBUTTON RELEASES

FIELD OF THE INVENTION

The present invention generally relates to vehicle door releases, and more particularly relates to a vehicle door that includes a sensor pad or button that can be utilized to unlatch and open a door.

BACKGROUND OF THE INVENTION

Various types of vehicle doors and door handles have been developed. Outside door handles typically protrude outwardly from the door. These door handles may be mechanically connected to a door latch by a linkage, and movement of the door handle is typically required to unlatch the door. However, existing door handles may suffer from various drawbacks.

SUMMARY OF THE INVENTION

According to one aspect of the present disclosure, a vehicle door system includes a door structure that is configured to be movably mounted to a vehicle body structure. The vehicle door system further includes a controller and a powered latch that is configured to retain the door structure in a closed position when the powered latch is latched. The powered latch permits the door to be opened when the powered latch is unlatched. The vehicle door system further includes an electronic door release pad that is disposed or fixed on an outer side of the door structure. The door release pad may have a substantially flat sensing surface facing outwardly away from the door structure, and a perimeter extending around the flat sensing surface. An outer side of the door structure may have a substantially flat outer surface extending continuously around the perimeter of the flat sensing surface in close proximity thereto. The flat sensing surface of the door release pad preferably comprises a sensor, such as a touch sensor and/or a capacitive sensor. The controller is configured to generate a signal to unlatch the powered latch if the door release pad generates a signal indicating that a user has touched the flat sensing surface and/or that an object has been detected adjacent the door release pad.

Embodiments of the first aspect of the disclosure can include any one or a combination of the following features:
  The door releases/unlatches if a capacitive sensor detects a user and also detects a force change applied to the door release pad.
  The controller may be configured to require both a change in capacitance and a force change before generating a door unlatch command.
  The door release pad or a region of the door adjacent the door release pad may illuminate upon activation to open, or turn red when the vehicle door is locked and latched.
  The vehicle door may be designed to operate as a "approach unlock/unlatch and power present the door" and walk away lock (as a person with a fob or keycard who is the legitimate owner of the vehicle with an authenticating fob or keycard walk away from the vehicle, the vehicle will lock itself).
  The vehicle door may include a powered actuator that initially shifts the door to a partially open presented position after the powered latch is unlatched.
  The vehicle door may have a substantially smooth outer surface without a protruding handle.

A vehicle door system according to another aspect of present disclosure including a powered latch and a powered door opener mounted to door structure. The vehicle door further includes a stationary horizontally elongated piezoelectric strip on the outside of the door. The vehicle door further includes a controller that is configured to illuminate a lower edge of the piezoelectric strip if a fob is detected. The controller is further configured to unlatch the powered latch followed by actuation of the door opener if a single touch is detected anywhere on the piezoelectric strip.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
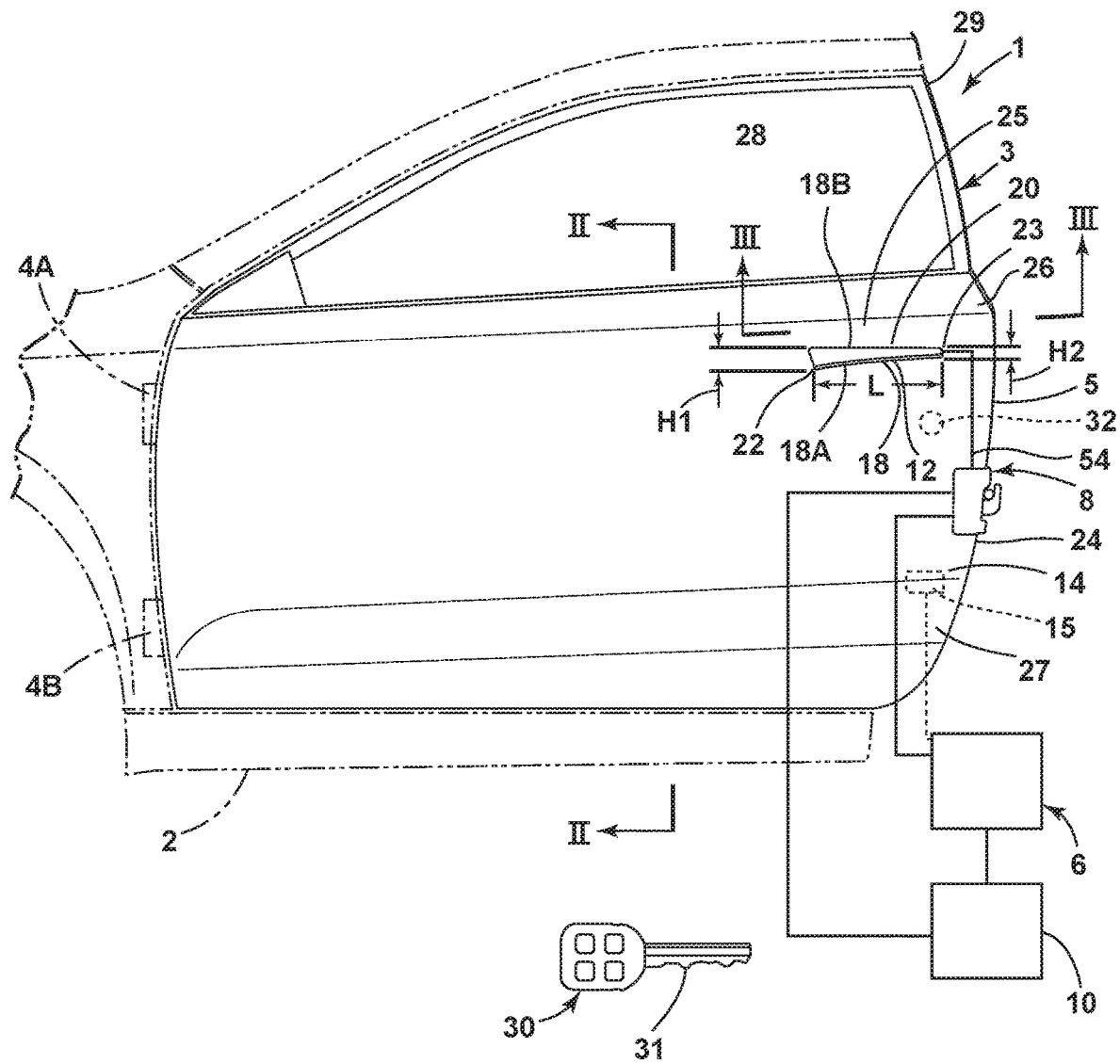
FIG. 1 is a partially schematic side elevational view of a vehicle door according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With reference to FIG. 1, a motor vehicle 1 includes a body structure 2 and a door 3 having a door structure 5 that is movably mounted to the body structure 2 by suitable structure such as hinges 4A and 4B. The vehicle door 3 comprises a door system that includes a door structure 5 and a controller 6. A powered latch 8 is operably connected to the controller 6. The controller 6 and powered latch 8 may be operably connected to an electrical power supply 10. It will be understood that electrical power supply 10 may comprise one or more batteries or other suitable sources of electrical power.

The powered latch 8 is configured to retain the door structure 5 in a closed position when the powered latch 8 is latched, and the powered latch 8 permits the door to be opened when the powered latch is unlatched. Powered latch 8 may comprise a powered door latch as described in U.S. patent application Ser. No. 14/696,749, filed on Apr. 27, 2015, now U.S. Pat. No. 10,323,442, entitled ELECTRONIC SAFE DOOR UNLATCHING OPERATIONS, the entire contents of which are incorporated herein by reference.

Figure 2:
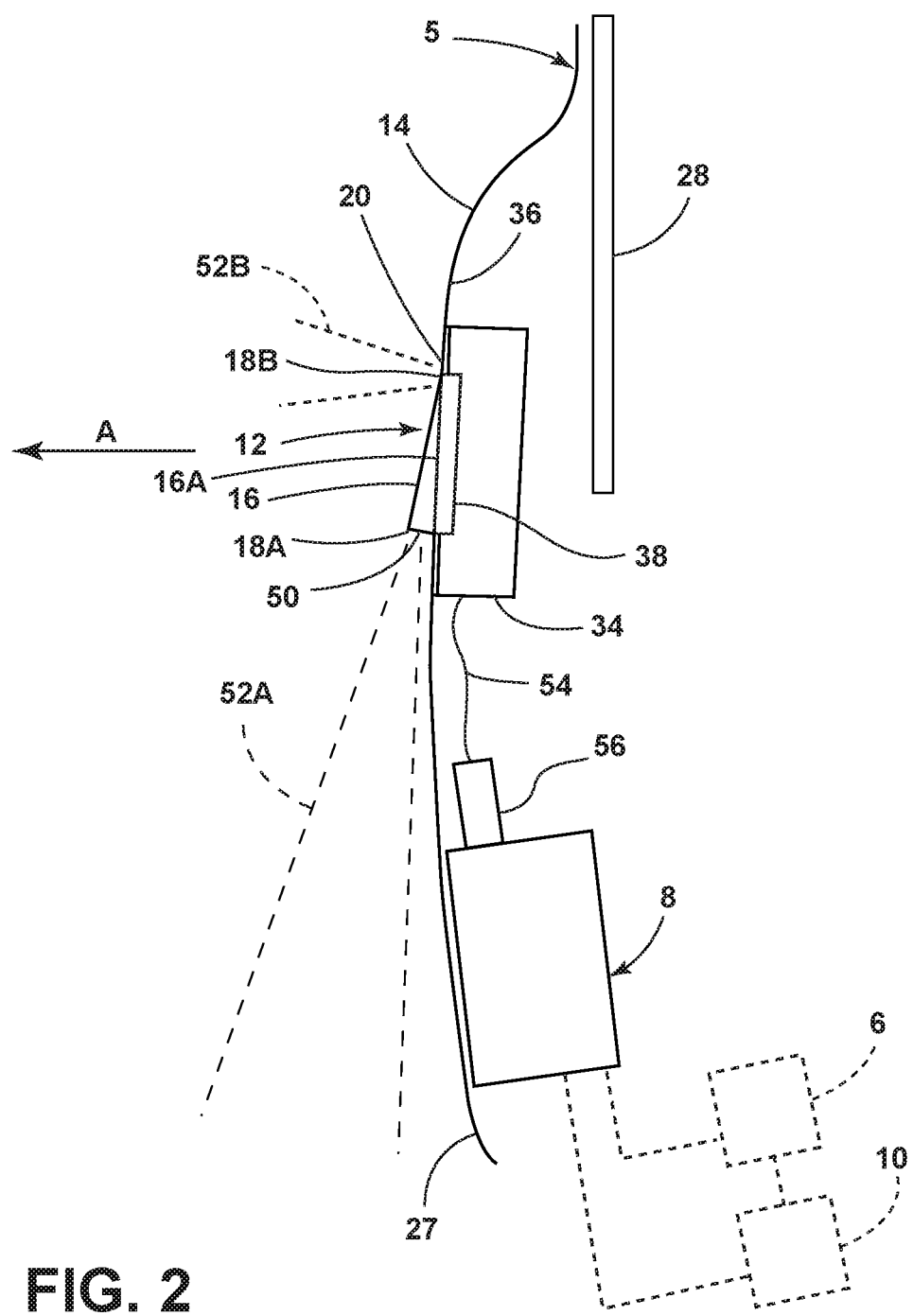
FIG. 2 is a partially schematic cross sectional view of the vehicle door of FIG. 1 taken along the line II-II.
Figure 3:
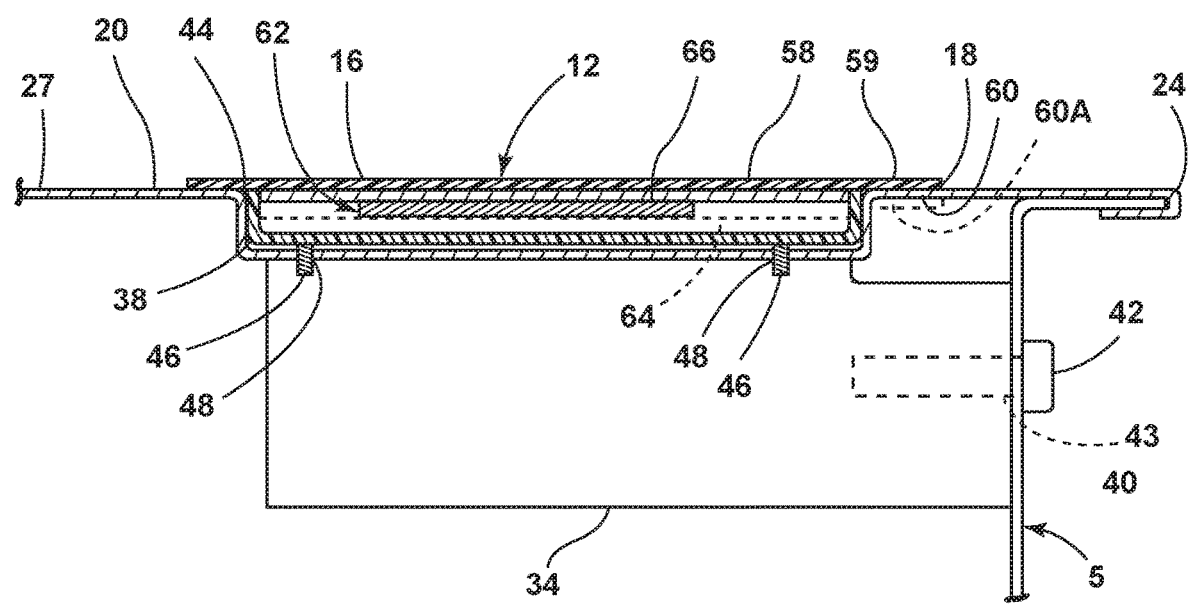
FIG. 3 is a cross sectional view of a portion of the vehicle door of FIG. 1 taken along the line III-III.

The vehicle door 3 further includes a door release pad 12 that is disposed or fixed on an outer side 14 of the door structure 5 (see also FIG. 2). The door release pad 12 includes a substantially flat surface 16 that faces outwardly in the direction of "A" of FIG. 2 away from the door structure 5. The door release pad 12 further includes a perimeter 18 extending around the flat sensing surface 16 as shown in FIGS. 2 and 3. The outer side of the door structure 5 has a substantially flat outer surface 20 extending continuously around the perimeter 18 of the flat sensing surface 16 in close proximity thereto. As discussed in more detail below, the flat surface 16 of the door release pad 12 may comprise a sensing surface including touch sensor and/or other suitable sensors (e.g. capacitive sensitivity). The controller 6 may be configured to generate a signal to unlatch the powered door latch 8 if the door release pad 12 generates a signal indicating that a user has touched the flat sensing surface 16. As discussed in more detail below, a connection with FIGS. 5 and 6, vehicle 1 may include a powered actuator 15 that shifts door 3 to a partially open position to permit a user to grasp rear edge 24 of door 3 to pull door 3 to a fully open position.

Referring again to FIG. 1, the perimeter 18 of door release pad 12 is generally oblong, with an elongated narrow shape extending in a horizontal direction. Perimeter 18 has a length "L", a height "H" at a forward N22 of door release pad 22, and a height "H2" at a rearward end 23 of the door release pad. The dimensions L, H and H2 may be varied as required for a particular application. In general, the length L is preferably about 150-200 mm, the height H is about 25 mm, and the dimension H2 is about 12 mm. However, it will be understood that virtually any size or shape may be utilized. The door release pad 12 may be positioned in an upper rear portion 25 of door 3 adjacent rear edge 24 below beltline 26 of door 3. The beltline 26 generally comprises the region of outer skin 27 of door structure 5 immediately below window 28 of door 3. Thus, the door release pad 12 may be positioned in a region of door 3 that is commonly used to mount conventional protruding door handles. This position of door release pad 12 is typically more intuitive for users who are accustomed to using conventional door handles. However, it will be understood that the door release pad 12 is not a door handle in a conventional sense, and door release 12 does not need to include a gripping feature that a user could grasp to pull the door 3 open. In general, the door release pad 12 could have virtually any shape or size, and could be positioned in virtually any location either on door 3 or on vehicle body 2. For example, a door release pad 12 could be mounted on a rear portion of frame 29 of door structure 5 adjacent window 28. As discussed in more detail below, a fob 30 may be configured to communicate wirelessly with controller 6 to provide for authentication of a user to permit unlatching of powered door latch 8 if fob 30 recognized (authorized). The fob 30 may optionally include a key 31 that is configured to engage in optional lock cylinder 32 in the event the door release pad 12 or other electrical components malfunction.

With further reference to FIGS. 2 and 3, door release pad 12 may comprise a housing 38 that is secured to the door structure 5 by a support structure 34. In the illustrated example, the support structure 34 is secured to a rear edge structure 40 (FIG. 3) of door structure 5 by a threaded fastener 42 that engages a threaded opening 43 of support structure 34. The housing 38 may comprise a polymer material, and may be disposed in a shallow pocket 44 formed in outer skin 27 of door structure 5. Housing 38 may include pins 46 that extend through openings 48 in outer skin 27 in end pocket 44 to thereby locate and secure the housing 38 to the door structure 5. It will be understood that a wide variety of housings, mounting structures and the like may be utilized to secure the door release pad 12 to the door structure 5.

Referring again to FIG. 2, a horizontally extending lower edge 50 of door release pad 12 may optionally project outwardly away from outer side 14 of door structure 5 such that a lower edge portion of door release pad 12 is spaced outwardly (e.g. 5 mm or other suitable dimension) from outer surface 20 of door structure 5. The edge 50 may be illuminated by LEDs or other suitable light sources to form a "light bar" that projects light 52 downwardly adjacent door 3 if predefined conditions occur. Light 52 may have sufficient brightness to illuminate a ground surface below and adjacent door 3 at night. The edge 50 may comprise a downwardly-facing surface extending along a generally horizontal lower perimeter portion 18A. In a preferred embodiment, only the lower perimeter portion 18A at edge 50 is illuminated. However, the entire perimeter 18 of door release pad 12 may be illuminated, or only selected portions of perimeter 18 may be illuminated. For example, a horizontal upper portion 18 of perimeter 18 may be illuminated, and may transit light 52A outwardly in the direction of arrow "A". Also, lower perimeter 18A may be flush with outer surface 20 of door structure 5 such that surface 16A of door release pad 12 is flush (substantially coplanar) with surface 20.

The door release pad 12 may be operably interconnected to powered door latch 8 by conductors such as electrical lines 54 and a 5-pin sealed connector 56, or other suitable connecting arrangement. It will be understood that the various components of vehicle 1 may be configured to communicate via electrically conductive lines, fiber optic lines, wireless communication systems, or virtually any other suitable arrangement.

Figure 4:
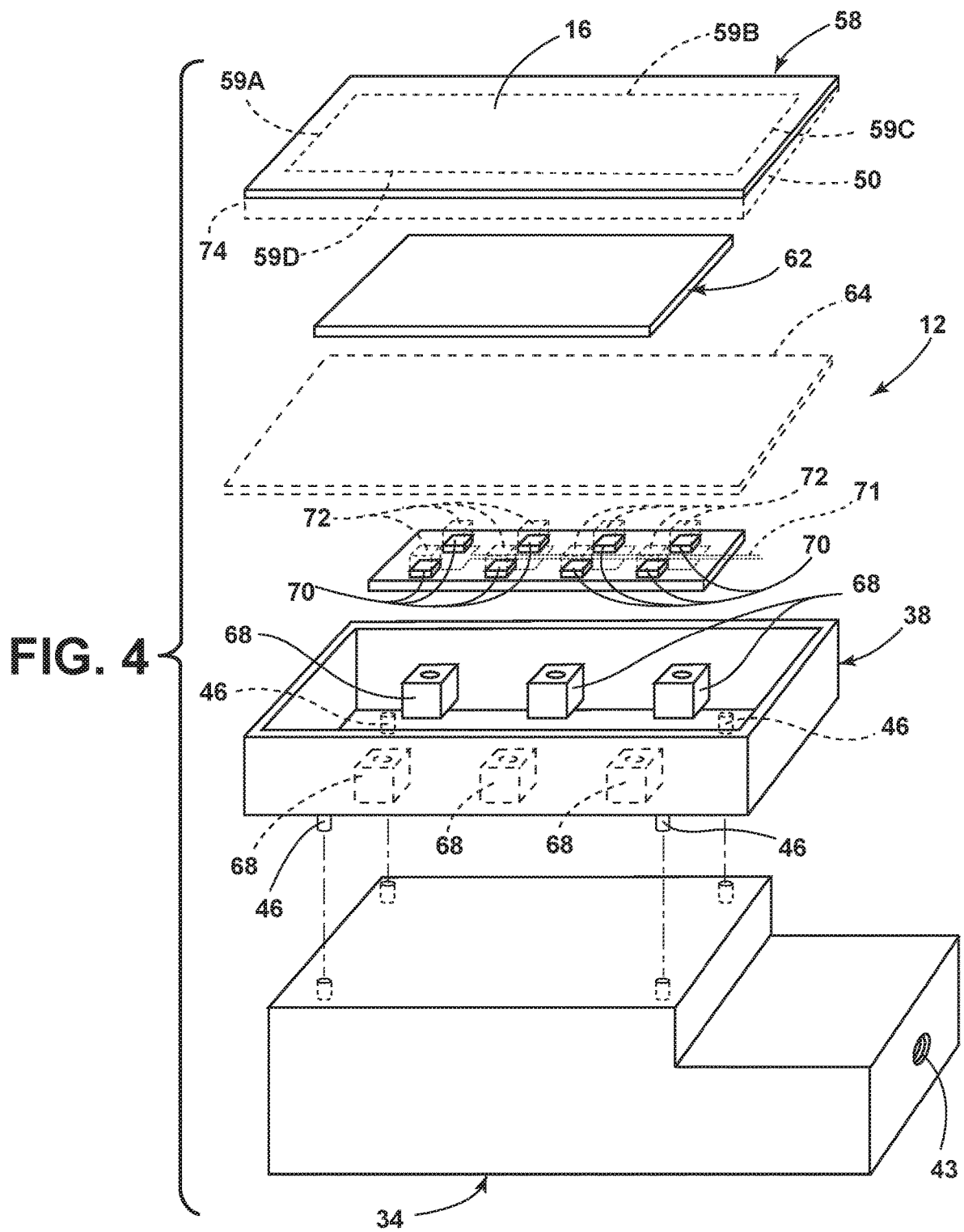
FIG. 4 is an exploded perspective view of a sensor pad assembly according to one aspect of the present disclosure.

With reference to FIGS. 3 and 4, door release pad 12 may comprise an outer layer 58 having an edge portion 59 that overlaps a portion 60 of outer skin 27 around the pocket 44. The outer layer 58 may comprise a light-transmitting polymer material or other suitable material. Optionally, a region 60A of outer skin 27 may be recessed inwardly in an amount that is approximately equal to a thickness of outer layer 58, such that flat sensing surface 16 formed by outer layer 58 is substantially co-planar with flat outer surface 20 of outer skin 27 of door structure 5.

The door release pad 12 also includes a sensor 62 that is positioned immediately inside outer layer 58, and a printed circuit board 66. An optional support structure such as plate 64 may be utilized to support the sensor 62 on internal supports 68 of housing 38. The sensor 62 may comprise a capacitive sensor that is configured to detect the presence of an object (e.g. a user's hand) that is located directly adjacent the flat sensing surface 16 formed by outer layer 58. The sensor 62 may also comprise a force resistance sensor, a load sensor, an inductive sensor, or a piezoelectric sensor. As discussed above, the door release pad 12 is operably connected to the controller 6. In particular, the sensor 62 may be operably connected to the controller 6. The controller 6 may be configured to "look for" (i.e. require) both a capacitance change and a force change before allowing an unlatched signal to the powered door latch 8 to be processed. More specifically, as noted above, the sensor 62 may comprise a capacitive sensor in combination with a second sensing capability, wherein the second sensing capability comprises one or more of 1) force resistance, 2) load sensing, 3) inductive sensing, or 4) piezoelectric sensing. If sensor 62 is configured in this manner, controller 6 may be configured to ignore a "capacitive only" signal or a "force change only" signal from sensor 62. If controller 6 is required to receive two separate inputs from sensor 62, this reduces inadvertent unlatching that could otherwise result if sensor 62 comprises only a capacitive sensor or only a second sensor (wherein the second sensor comprises one of a force resistance sensor, a load sensor, an inductive sensor, or a piezoelectric sensor). Controller 6 may also be configured to require detection.

Alternatively, the sensor 62 may comprise a single sensor. For example, the sensor 62 may comprise a force sensor only, such that a force applied to flat sensing surface 16 by a user will be detected by sensor 62, causing a signal to be sent to the controller 6. Controller 6 may optionally be configured to require an authorization signal from fob 30 or other suitable authorization signal in addition to detection of a force on flat sensing surface 16 in order to generate an unlatched signal to powered door latch 8.

Alternatively, sensor 62 may comprise a capacitive sensor only, and controller 6 may be configured to unlatch powered latch 8 if a user's hand is detected in the vicinity of sensing surface 16.

Referring again to FIG. 4, one or more light sources such as LEDS 70 may be mounted to the printed circuit board 66. Printed circuit board 66 may include electrical conductors 71 that operably interconnect the printed circuit board 66 to the controller 6. One or more light pipes 72 may be configured to transmit light from the LEDS 70 to one or more edge portions 59A-59D of outer layer 58 to thereby illuminate selected portions of outer layer 58. Outer layer 58 may comprise a transparent or translucent light-transmitting polymer material. It will be understood that the light pipes 72 are shown in schematic form in FIG. 4. Also, light pipes 72 may comprise transparent polymer, and may be configured as required to illuminate one or more specific portions of outer layer 58In particular, outer layer 58 may include an edge 74 having an increased thickness to thereby form an illuminated edge 50. As discussed above, the illuminated edge 50 may face downwardly (FIG. 2) to project light 52A downwardly.

LEDS 70 may be configured to provide various colors and intensities of light. For example, if a user having an authorized fob 30 approaches the vehicle 1, controller 6 may be configured to cause LEDS 70 to illuminate to provide a soft blue or soft white color light 52A and/or 52B (FIG. 2). The same light may change to green when the controller 6 unlocks and/or unlatches powered door latch 8. Also, controller 6 may be configured to cause the LEDS to generate red light if the vehicle door 3 is latched and locked. It will be understood that the powered door latch 8 may have a locked and unlocked state (e.g. stored in memory), and latch 8 may require unlocking (e.g. require detection of an authorized fob 30) prior to generating an unlatch signal. This locking and unlatching function may generally correspond to locking and unlatching functions of conventional mechanical door latches which require the door to be unlocked, and also require movement of a handle to mechanically unlatch the door latch.

Figure 5:
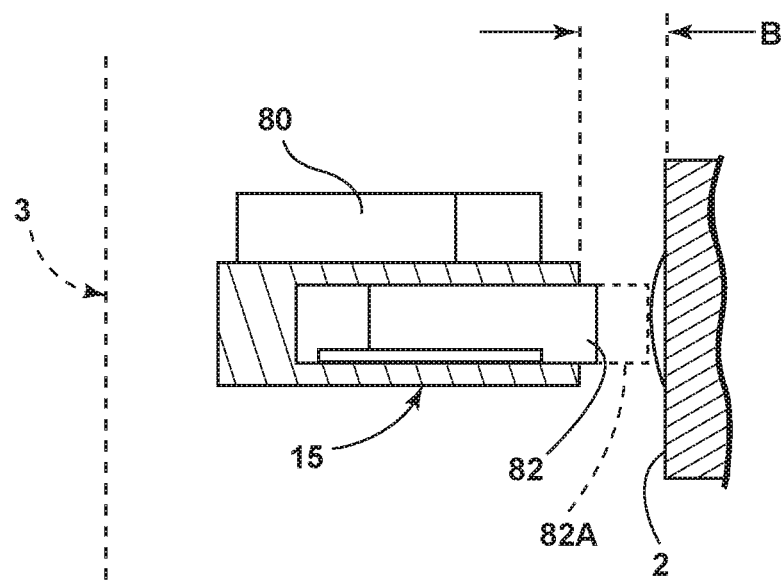
FIG. 5 is a partially schematic view of a powered actuator that initially opens the vehicle door to a partially open "presented" position.
Figure 6:
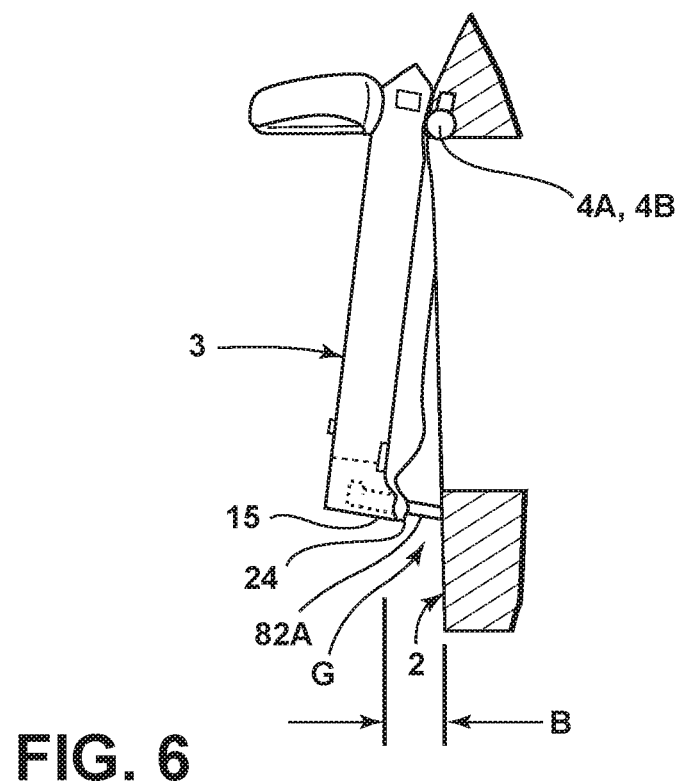
FIG. 6 is a partially schematic top plan view showing the vehicle door in a partially open "presented" position.

With reference to FIGS. 5 and 6, the door system may include a powered door opening device 15 having an electrically-powered actuator 80 and a plunger 82 that extends to an extended position 82A upon actuation of the electric actuary 80. The door opening device 15 is operably connected to the controller 6. During operation of door 3, the controller 6 unlocks and unlatches powered door latch 8 according to predefined criteria as discussed in more detail above. After the powered door latch 8 is unlatched, controller 6 causes the door opening device 15 to be actuated, thereby shifting plunger 82 outwardly to move door 3 from a closed position to an open position. The door opening device 15 is preferably positioned adjacent rear edge 24 of door 3, such that the door opening device 15 partially opens door 3 when the electric actuator 80 is actuated. The rear edge 24 of door 3 may be positioned outwardly a distance "B", thereby forming a gap "G" between the rear edge 24 of door 3 and the vehicle body structure 2 upon actuation of door opening device 15. A user can then insert a portion of his or her hand into the gap "G" and pull the door 3 to a fully opened position. Thus, the door opening device 15 permits the door 3 to be grasped and pulled to a fully opened position without the need for an external handle on door 3. The door opening device 15 may comprise an actuator as described in detail in U.S. patent application Ser. No. 15/269,281, filed on Sep. 19, 2016, now U.S. Pat. No. 10,458,171, entitled ANTI-PINCH LOGIC FOR DOOR OPENING ACTUATOR, the entire contents of which are hereby incorporated herein by reference.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door system, comprising:
a vehicle door including a door structure configured to be movably mounted to a vehicle body structure to permit passenger entry and exit when the vehicle door is in an open position, the door structure including an outer side;
a controller;
a powered latch configured to retain the vehicle door in a closed position when the powered latch is latched, and wherein the powered latch permits the vehicle door to be opened when the powered latch is unlatched, and wherein the powered latch has locked and unlocked states;
an electronic door release pad disposed on an outer side of the door structure, the door release pad having a substantially flat sensing surface facing outwardly away from the door structure, and a perimeter extending around the flat sensing surface, the outer side of the door structure having a substantially flat outer surface extending continuously around the perimeter of the flat sensing surface in proximity thereto;
wherein the flat sensing surface of the door release pad comprises a touch sensor;
wherein the controller is configured to generate a signal to unlatch the powered latch if the powered latch is unlocked and if the door release pad generates a signal indicating that a user has touched the flat sensing surface;
a powered actuator configured to move the door structure from a closed position to an open position after the controller causes the powered latch to unlatch.

2. The vehicle door system of claim 1, wherein:
the door release pad comprises a piezoelectric sensor.

3. The vehicle door system of claim 2, wherein:
the flat sensing surface of the door release pad has an elongated shape defined by the perimeter and extending in a horizontal direction and having a horizontal dimension of 150-200 mm and a vertical dimension of at least 12 mm.

4. The vehicle door system of claim 3, wherein:
the flat sensing surface is at least 4 inches long, and has a maximum vertical dimension of less than 2 inches; and
wherein substantially the entire flat sensing surface comprises a single sensing surface.

5. The vehicle door system of claim 3, including:
a capacitive sensor; and wherein:
the controller is configured to generate a signal to unlatch the powered latch only if: 1) the capacitive sensor detects an object; and 2) the door release pad generates a signal indicating that a user has touched the flat sensing surface.

6. The vehicle door system of claim 5, wherein:
the touch sensor is selected from the group consisting of three resistance sensors, load sensors, inductive sensors, and piezo sensors.

7. The vehicle door system of claim 1, wherein:
the controller is configured to unlock and unlatch the vehicle door system and actuate the powered actuator to open the vehicle door if an authenticated keycard is detected.

8. A vehicle door system, comprising:
a vehicle door including a door structure configured to be movably mounted to a vehicle body structure to permit passenger entry and exit when the vehicle door is in an open position, the door structure including an outer side;
a controller;
a powered latch configured to retain the vehicle door in a closed position when the powered latch is latched, and wherein the powered latch permits the vehicle door to be opened when the powered latch is unlatched;
an electronic door release pad disposed on an outer side of the door structure, the door release pad having a substantially flat sensing surface facing outwardly away from the door structure, and a perimeter extending around the flat sensing surface, the outer side of the door structure having a substantially flat outer surface extending continuously around the perimeter of the flat sensing surface in proximity thereto;
wherein the flat sensing surface of the door release pad comprises a touch sensor; and
wherein the controller is configured to generate a signal to unlatch the powered latch if the door release pad generates a signal indicating that a user has touched the flat sensing surface;
wherein the door release pad comprises a piezoelectric sensor;
wherein the flat sensing surface of the door release pad has an elongated shape defined by the perimeter and extending in a horizontal direction;
the perimeter of the door release pad including a horizontally-extending lower edge that is spaced outwardly from the outer surface of the door structure, the door release pad further including a light bar extending along the lower edge, wherein the controller causes the light bar to be illuminated if a predefined condition occurs.

9. The vehicle door system of claim 8, wherein:
the predefined condition is selected from the group consisting of: a user having a recognized fob approaches the vehicle, the controller unlatches the powered latch, and the controller latches the powered latch.

10. The vehicle door system of claim 8, wherein:
the light bar comprises a downwardly-facing surface.

11. The vehicle door system of claim 8, wherein:
the controller causes the light bar to be illuminated a first color if a first predefined condition occurs, and causes the light bar to be illuminated a second color that is not the same as the first color if a second predefined condition occurs.

12. A vehicle door system, comprising:
a vehicle door including a door structure configured to be movably mounted to a vehicle body structure to permit passenger entry and exit when the vehicle door is in an open position, the door structure including an outer side;
a controller;
a powered latch configured to retain the vehicle door in a closed position when the powered latch is latched, and wherein the powered latch permits the vehicle door to be opened when the powered latch is unlatched;
an electronic door release pad disposed on an outer side of the door structure, the door release pad having a substantially flat sensing surface facing outwardly away from the door structure, and a perimeter extending around the flat sensing surface, the outer side of the door structure having a substantially flat outer surface extending continuously around the perimeter of the flat sensing surface in proximity thereto;
wherein the flat sensing surface of the door release pad comprises a touch sensor; and
wherein the controller is configured to generate a signal to unlatch the powered latch if the door release pad generates a signal indicating that a user has touched the flat sensing surface, and including:
a light source configured to illuminate an edge of the door release pad when the controller generates a signal to unlatch the powered latch.

13. The vehicle door system of claim 12, wherein:
the light source is configured to generate green light when the controller generates a signal to unlatch the powered latch, and to generate red light if the vehicle door system is in a locked state.

14. A vehicle door system, comprising:
a vehicle door including a door structure configured to be movably mounted to a vehicle body structure to permit passenger entry and exit when the vehicle door is in an open position, the door structure including an outer side;
a controller;
a powered latch configured to retain the vehicle door in a closed position when the powered latch is latched, and wherein towered latch permits the vehicle door to be opened when the powered latch is unlatched;
an electronic door release pad disposed on an outer side of the door structure, the door release pad having a substantially flat sensing surface facing outwardly away from the door structure, and a perimeter extending around the flat sensing surface, the outer side of the door structure having a substantially flat outer surface extending continuously around the perimeter of the flat sensing surface in proximity thereto;
wherein the flat sensing surface of the door release pad comprises a touch sensor; and
wherein the controller is configured to generate a signal to unlatch the powered latch if the door release pad generates a signal indicating that a user has touched the flat sensing surface;
a sensing system configured to detect humans in a vicinity outside the vehicle; and wherein:
the controller is configured to: 1) determine an intent of the detected humans; and 2) only unlock or unlatch the powered latch if the intent is to enter the vehicle.

15. A vehicle door configured to permit passenger entry and exit when the vehicle door is in an open position, the vehicle door comprising:
a powered latch and a powered door Opener mounted to a door structure;
a stationary horizontally elongated piezoelectric strip on an outside of the door structure; and
a controller configured to illuminate a lower edge of the piezoelectric strip if a fob is detected, and unlatch the powered latch followed by actuating the door opener if a single touch is detected anywhere on the piezoelectric strip.

16. The vehicle door of claim 15, wherein:
the piezoelectric strip has a flat outer surface.

17. The vehicle door of claim 15, wherein:
the piezoelectric strip comprises a pad having an upper edge that is flush with an outer surface of the door structure, and a lower edge that is spaced outwardly away from the outer surface of the door structure.

18. The vehicle door of claim 17, wherein:
the lower edge of the piezoelectric strip includes a surface that faces downwardly.

19. The vehicle door of claim 18, wherein:
the downwardly-facing surface comprises a light-transmitting material, and including:
an LED light source disposed in the pad to illuminate the downwardly facing surface.

* * * * *

UNITED STATES PATENT AND TRADEMARK OFFICE
CERTIFICATE OF CORRECTION

PATENT NO. : 10,907,386 B2
APPLICATION NO. : 16/002650
DATED : February 2, 2021
INVENTOR(S) : Walawender et al.

Page 1 of 1

It is certified that error appears in the above-identified patent and that said Letters Patent is hereby corrected as shown below:

In the Claims

Column 8;
Claim 6, Line 19:
"three" should be --force--.

Column 10;
Claim 14, Line 1:
After "wherein" insert --the--.
Claim 14, Line 1:
"towered" should be --powered--.
Claim 15, Line 25:
"Opener" should be --opener--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*